(12) United States Patent
Lee et al.

(10) Patent No.: US 9,329,639 B2
(45) Date of Patent: May 3, 2016

(54) ELECTRONIC DEVICE

(71) Applicant: Quanta Computer Inc., Taoyuan Shien (TW)

(72) Inventors: Szu-Chi Lee, New Taipei (TW);
Huang-Lin Lee, New Taipei (TW);
I-Hao Chen, New Taipei (TW); Kun-Ho Lee, New Taipei (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 180 days.

(21) Appl. No.: 14/177,726

(22) Filed: Feb. 11, 2014

(65) Prior Publication Data

US 2015/0062792 A1   Mar. 5, 2015

(30) Foreign Application Priority Data

Sep. 5, 2013  (TW) .............................. 102132038 A (51) Int. Cl.
*G06F 1/16*  (2006.01)

(52) U.S. Cl.
CPC .............. *G06F 1/1669* (2013.01); *G06F 1/166* (2013.01)

(58) Field of Classification Search
None
See application file for complete search history.

(56) References Cited

U.S. PATENT DOCUMENTS

| | | | | |
|---|---|---|---|---|
| 5,440,502 A | * | 8/1995 | Register | G06F 1/1626 345/168 |
| 5,539,615 A | * | 7/1996 | Sellers | B41J 11/56 361/679.12 |
| 5,659,307 A | * | 8/1997 | Karidis | G06F 1/1616 341/20 |
| 5,673,169 A | * | 9/1997 | Wicks | G06F 1/1616 361/679.4 |
| 5,754,395 A | * | 5/1998 | Hsu | G06F 1/1667 361/679.11 |
| 5,907,615 A | * | 5/1999 | Kaschke | H04B 1/3833 379/433.12 |
| 6,028,768 A | * | 2/2000 | Cipolla | G06F 1/1616 361/679.12 |
| 6,157,958 A | * | 12/2000 | Armitage | G06F 1/1626 709/250 |
| 6,282,082 B1 | * | 8/2001 | Armitage | G06F 1/16 312/223.2 |
| 6,898,073 B2 | * | 5/2005 | Lin | G06F 1/1616 361/679.08 |
| 6,989,984 B2 | * | 1/2006 | Sutton | G06F 1/1616 345/169 |
| 7,130,669 B2 | * | 10/2006 | Moon | G06F 1/1616 455/575.1 |
| 7,342,776 B1 | * | 3/2008 | Chan | G06F 1/1616 345/169 |
| 7,489,503 B2 | * | 2/2009 | Maatta | G06F 1/1616 16/367 |

(Continued)

*Primary Examiner* — Courtney Smith
*Assistant Examiner* — Rashen E Morrison
(74) *Attorney, Agent, or Firm* — Rabin & Berdo, P.C.

(57) ABSTRACT

An electronic device includes a front panel, a back cover, a stand, and at least one hinge module. The stand is disposed on a surface of the back cover opposite to the front panel and is rotatable relative to the surface. The hinge module disposed between the front panel and the back cover includes a fixing element, a sliding element, a pivot, and a spring strip. The fixing element has a hole, and the fixing element is fixed on the back cover, such that an accommodating space is formed between the fixing element and the back cover. The sliding element having a hook portion is slidably disposed in the accommodating space. The pivot is slidably disposed in the accommodating space. The sliding element is connected to the stand by the pivot. The spring strip is disposed in the accommodating space. The spring strip is deformably fixed on the back cover.

10 Claims, 7 Drawing Sheets

(56) References Cited

U.S. PATENT DOCUMENTS

| | | | | |
|---|---|---|---|---|
| 7,567,433 B2* | 7/2009 | Chen | G06F 1/1616 | 248/917 |
| 8,009,143 B2* | 8/2011 | Huang | G06F 1/1616 | 345/168 |
| 8,023,254 B2* | 9/2011 | Zhou | G06F 1/1669 | 248/917 |
| 8,416,559 B2* | 4/2013 | Agata | G06F 1/1613 | 345/168 |
| 8,451,595 B2* | 5/2013 | Leung | G06F 1/1616 | 312/223.1 |
| 8,494,602 B2* | 7/2013 | Wang | H04M 1/0241 | 455/347 |
| 8,537,542 B2* | 9/2013 | Chen | G06F 1/1616 | 345/168 |
| 8,550,421 B2* | 10/2013 | Liu | F16M 11/10 | 248/165 |
| 8,560,003 B2* | 10/2013 | Kwak | G06F 1/1622 | 361/679.39 |
| 8,654,520 B2* | 2/2014 | Lin | G06F 1/1624 | 361/679.02 |
| 8,724,301 B2* | 5/2014 | Mahmoud | G06F 3/02 | 345/901 |
| 8,763,977 B2* | 7/2014 | Huang | F16M 11/10 | 16/326 |
| 8,780,544 B2* | 7/2014 | Liang | G06F 1/1683 | 361/679.26 |
| 8,792,229 B2* | 7/2014 | Liang | G06F 1/1635 | 361/679.01 |
| 8,913,376 B2* | 12/2014 | Wu | G06F 1/1626 | 248/917 |
| 8,936,229 B2* | 1/2015 | Zhu | H04M 1/04 | 248/688 |
| 8,971,026 B2* | 3/2015 | Matsuoka | H05K 5/03 | 16/348 |
| 8,995,125 B2* | 3/2015 | Matsuoka | G06F 1/1658 | 361/679.55 |
| 9,047,048 B2* | 6/2015 | Ge | G06F 1/1616 | |
| 9,047,056 B2* | 6/2015 | Yu | G06F 1/1662 | |
| 9,060,445 B2* | 6/2015 | Song | H05K 7/16 | |
| 9,092,193 B2* | 7/2015 | Yang | G06F 1/1632 | |
| 9,098,245 B2* | 8/2015 | Lee | G06F 1/1679 | |
| 9,110,637 B2* | 8/2015 | Wu | G06F 1/162 | |
| 2002/0042853 A1* | 4/2002 | Santoh | G06F 1/1624 | 710/8 |
| 2002/0048155 A1* | 4/2002 | Chiang | G06F 1/1616 | 361/747 |
| 2004/0056843 A1* | 3/2004 | Lin | G06F 1/1616 | 345/168 |
| 2004/0160738 A1* | 8/2004 | Chen | G06F 1/16 | 361/679.08 |
| 2004/0190239 A1* | 9/2004 | Weng | G06F 1/1616 | 361/679.2 |
| 2005/0052831 A1* | 3/2005 | Chen | G06F 1/1616 | 361/679.11 |
| 2005/0200608 A1* | 9/2005 | Ulla | G06F 1/1626 | 345/168 |
| 2006/0038795 A1* | 2/2006 | Lee | E05B 65/006 | 345/173 |
| 2006/0104013 A1* | 5/2006 | Sakakibara | G06F 1/1624 | 361/679.11 |
| 2008/0094792 A1* | 4/2008 | Chen | G06F 1/1616 | 361/679.06 |
| 2010/0277858 A1* | 11/2010 | Zhou | G06F 1/1669 | 361/679.17 |
| 2012/0293953 A1* | 11/2012 | Wu | F16M 11/10 | 361/679.56 |
| 2013/0033807 A1* | 2/2013 | Kim | G06F 1/1669 | 361/679.01 |
| 2013/0100027 A1* | 4/2013 | Wang | G06F 1/1643 | 345/168 |
| 2013/0201621 A1* | 8/2013 | Song et al. | 361/679.27 | |
| 2013/0203473 A1* | 8/2013 | Kota | H04M 1/0202 | 455/575.8 |
| 2013/0257733 A1* | 10/2013 | Moore | G06F 1/1618 | 345/168 |
| 2013/0329375 A1* | 12/2013 | Chiang | G06F 1/162 | 361/728 |
| 2014/0185218 A1* | 7/2014 | Chen | G06F 1/1669 | 361/679.09 |
| 2014/0218855 A1* | 8/2014 | Fujino | G06F 1/1654 | 361/679.12 |

* cited by examiner

ELECTRONIC DEVICE

RELATED APPLICATIONS

This application claims priority to Taiwan Application Serial Number 102132038, filed Sep. 5, 2013, which is herein incorporated by reference.

BACKGROUND

1. Field of Invention

The present invention relates to an electronic device.

2. Description of Related Art

Currently, in order to make a display panel standing on a plane, a supporting stand is generally mounted on the back of the display panel. With tilting the supporting stand at a certain angle relative to the display panel, the display panel is supported on the plane. However, according to the prior art, the pivot connecting the display panel and the supporting stand is generally extended from the back cover of the display panel or the back cover is designed with an opening to allow the rotation of the supporting stand. Thus, the design above may damage the aesthetics of the display panel so that the purchase intention of a consumer may be affected. Besides, according to the conventional technology, the angle between the display panel and the supporting stand is normally fixed such that the requirement for multiple angles may not be satisfied.

SUMMARY

This invention provides an electronic device includes a front panel, a back cover, a stand, and at least one hinge module. The back cover is fixed on a main surface of the front panel. The stand is disposed on a surface of the back cover opposite to the front panel and is rotatable relative to the surface. The hinge module is disposed between the front panel and the back cover. The hinge module includes a fixing element, a sliding element, a pivot, and a spring strip. The fixing element has a hole, and the fixing element is fixed on the back cover, such that an accommodating space is formed between the fixing element and the back cover. The sliding element has a hook portion. The sliding element is disposed in the accommodating space and is slidable relative to the accommodating space. The pivot is disposed in the accommodating space and is slidable relative to the accommodating space. The sliding element is connected to the stand by the pivot. The spring strip is disposed in the accommodating space. The spring strip is fixed on the back cover and is deformable. When the stand covers the front panel, the pivot is located in the accommodating space. When a first angle is formed between the front panel and the stand, the pivot is located in the accommodating space. When a second angle is formed between the front panel and the stand, and the second angle is greater than the first angle, the pivot and the sliding element are moved by the stand so that the pivot is exposed from the back cover. Meanwhile, the sliding element is caught on the hole of the fixing element by the hook portion and the sliding element is abutted by the spring strip.

DESCRIPTION OF THE EMBODIMENTS

Reference will now be made in detail to the present embodiments of the invention, examples of which are illustrated in the accompanying drawings. To clarify this invention, some details for practice may be described in some embodiments. However, the person skilled in the art should understand these details may be not necessary for some other embodiments such that they should not to limit this invention. Besides, to simplify the drawings, some conventional structures or elements may be illustrated in a simple way. Wherever possible, the same reference numbers are used in the drawings and the description to refer to the same or like parts.

Figure 1A:
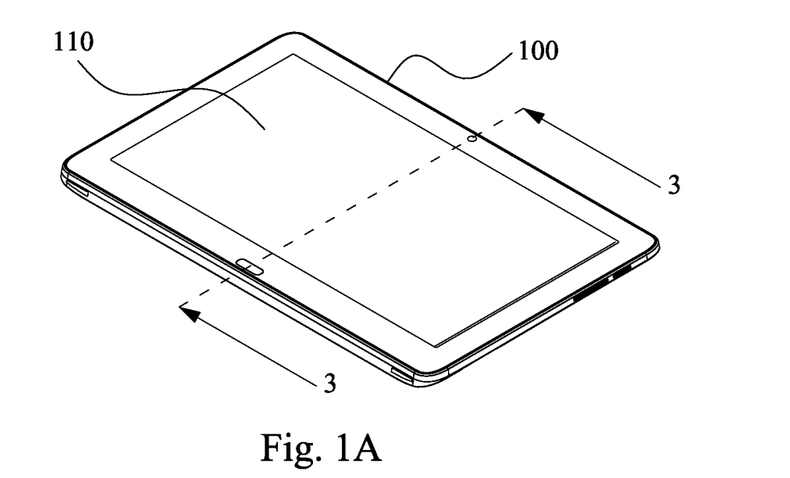
FIG. 1A is a front view of an electronic device in closed state according to one embodiment of this invention.
Figure 1B:
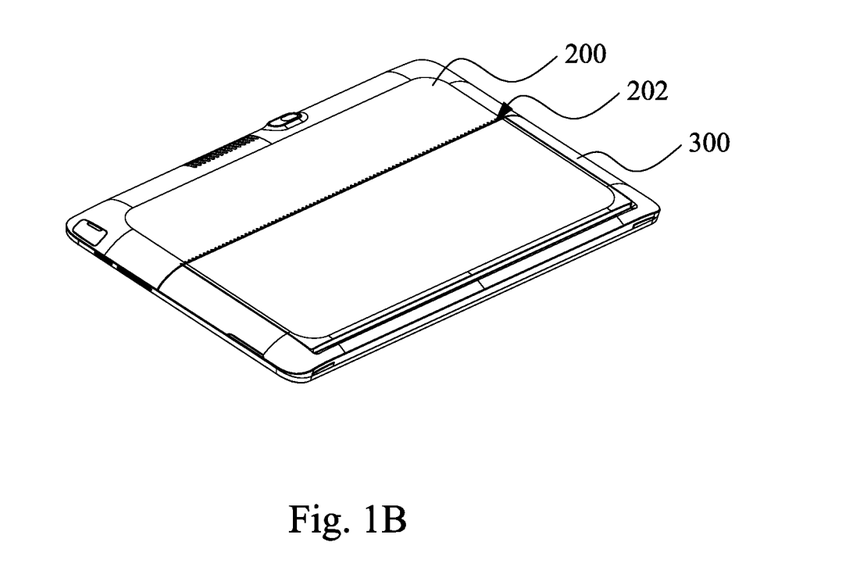
FIG. 1B is a bottom view of the electronic device in FIG. 1A.
Figure 2:
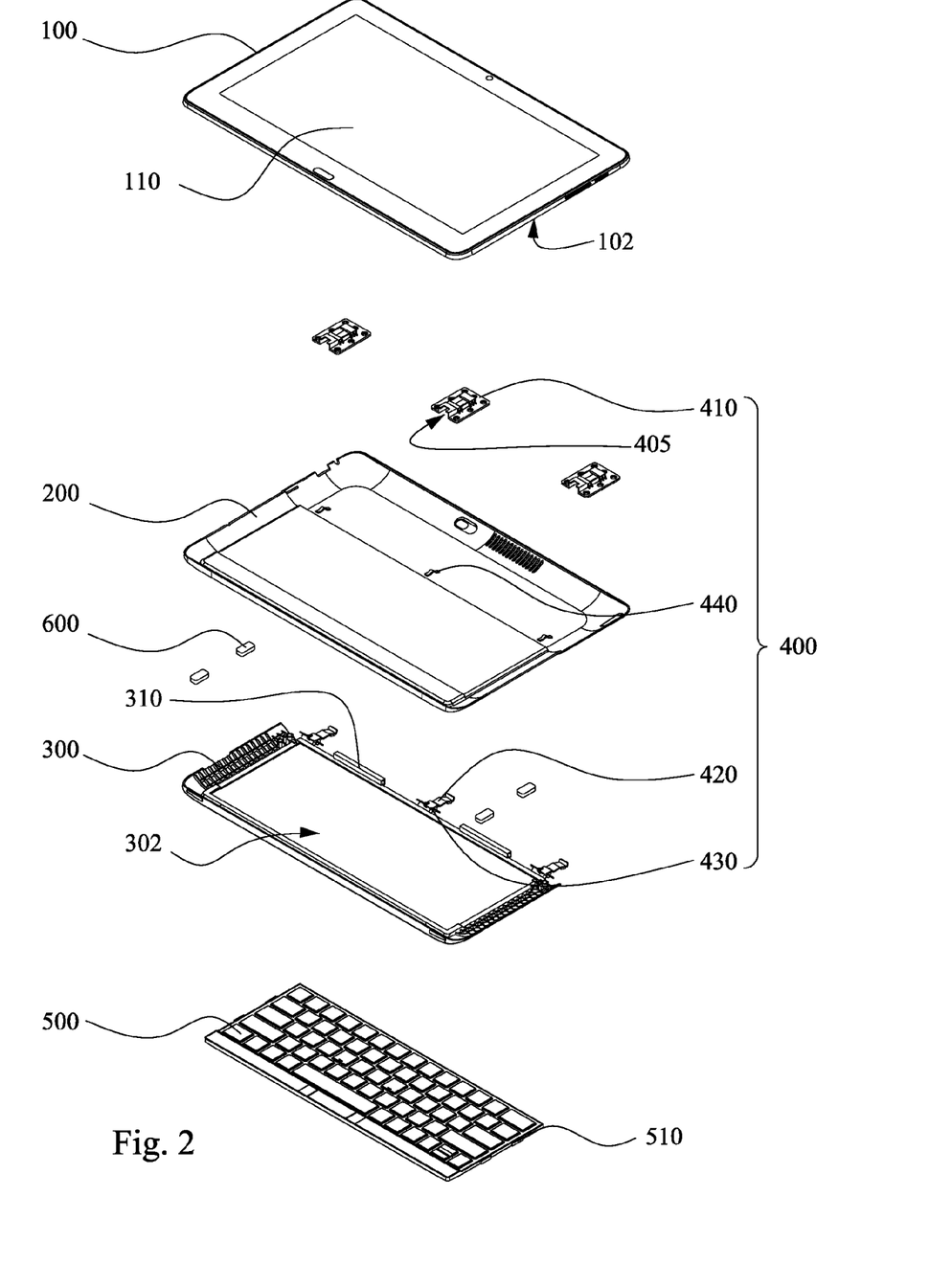
FIG. 2 is an exploded view of the electronic device in FIG. 1A.

Reference is made to FIG. 1A, FIG. 1B and FIG. 2. FIG. 1A is a front view of an electronic device in closed state according to one embodiment of this invention, FIG. 1B is a bottom view of the electronic device in FIG. 1A, and FIG. 2 is an exploded view of the electronic device in FIG. 1A. The electronic device includes a front panel 100, a back cover 200, a stand 300, and at least one hinge module 400. For example, in FIG. 2, the electronic device includes three hinge modules 400. The front panel 100, for example, includes a screen 110. The back cover 200 is fixed on one main surface 102 of the front panel 100. For instance, in FIG. 2, the main surface 102 may be the surface of the front panel 100 opposite to the screen 110. The stand 300 is disposed on the surface of the back cover 200 opposite the front panel 100 and is rotatable relative to the surface. That is, in FIG. 1A and FIG. 1B, a portion of the back cover 200 is located between the front panel 100 and the stand 300. Moreover, although the quantity of the hinge modules 400 is three in FIG. 2, the scope of this invention is not limited to this quantity. A person having ordinary shill in the art may select proper quantity of the hinge modules 400 according to actual requirements. It should be noted that in the context, when the stand 300 covers or attaches the front panel 100 (see FIG. 1A and FIG. 1B), the electronic device is defined as in closed state.

Figure 3:
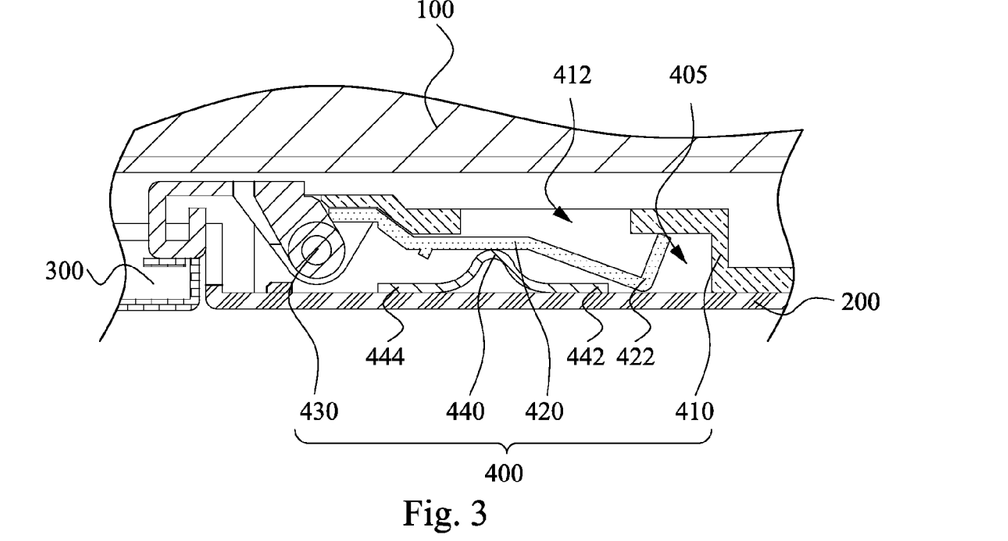
FIG. 3 is a cross-section view along line 3-3 in FIG. 1A.

Reference is made to FIG. 2 and FIG. 3, where FIG. 3 is a cross-section view along line 3-3 in FIG. 1A. The hinge module 400 is disposed between the front panel 100 and the back cover 200. The hinge module 400 includes a fixing element 410, a sliding element 420, a pivot 430, and a spring strip 440. The fixing element 410 has a hole 412, and the fixing element 410 is fixed on the back cover 200, such that an accommodating space 405 is formed between the fixing element 410 and the back cover 200. The sliding element 420 has a hook portion 422. The sliding element 420 is disposed in the accommodating space 405 and is slidable relative to the accommodating space 405. The pivot 430 is also disposed in the accommodating space 405 and is slidable relative to the accommodating space 405. The sliding element 420 is connected to the stand 300 by the pivot 430. In greater detail, one end 432 (see FIG. 5A) of the pivot 430 is connected to the stand 300, while the other end of the pivot 430 is connected to the sliding element 420. The spring strip 440 is disposed in the accommodating space 405. The spring strip 440 is fixed on the back cover 200 and is deformable. For example, in FIG. 3, one end 442 of the spring strip 440 is fixed on the back cover 200, while the other end 444 of the spring strip 440 is moved by the deformation of the spring strip 440. When the stand 300 covers the front panel 100, the pivot 430 is disposed in the accommodating space 405 and the sliding element 420 contacts the spring strip 440. In this embodiment, because the hinge module 400 is disposed between the front panel 100 and the back cover 200, the hinge module 400 may not extend from the back cover 200.

Figure 4:
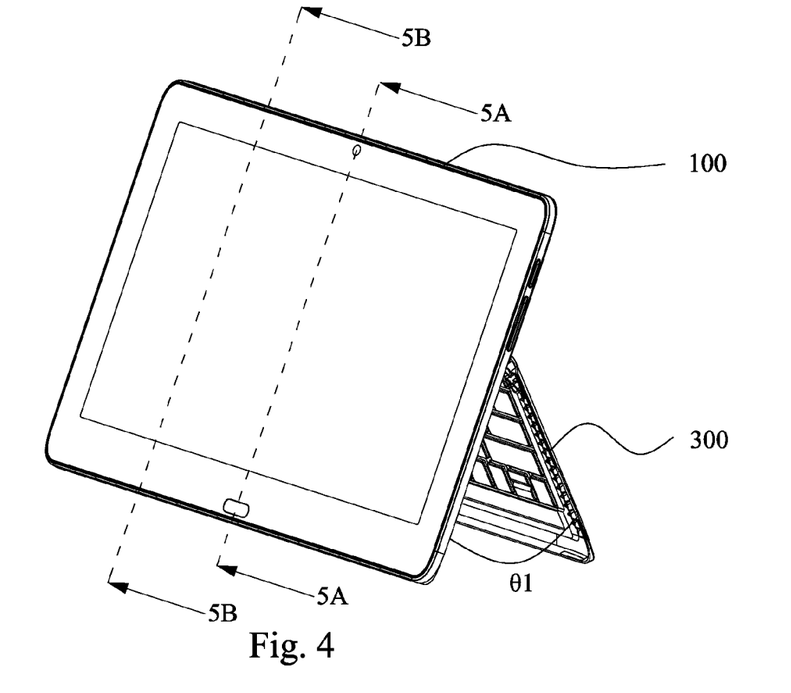
FIG. 4 is a perspective view of the electronic device in FIG. 1A which is in opened state.

Reference is made to FIG. 4 which is a perspective view of the electronic device in FIG. 1A which is in opened state. As shown in FIG. 4, a first angle θ1 can be formed between the stand 300 and the front panel 100 so that the front panel 100 could stand on a plane. In this embodiment, the first angle θ1 may be, for example, 50 degrees. However, the scope of this invention is not limited to this degree.

Figure 5A:
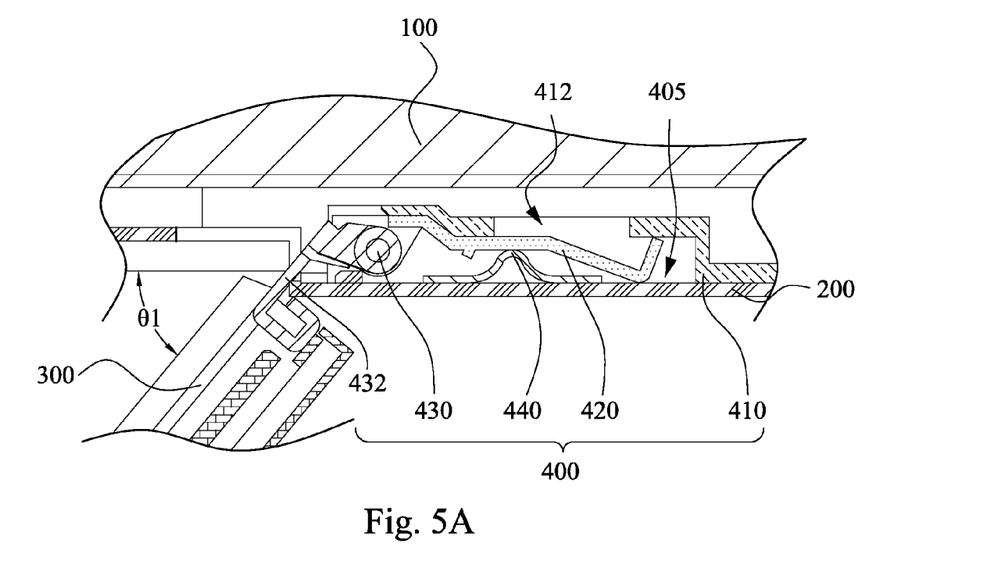
FIG. 5A is a cross-section view along line 5A-5A in FIG. 4.

Reference is made to FIG. 5A which is a cross-section view along 5A-5A in FIG. 4. When the first angle θ1 is formed between the stand 300 and the front panel 100, the pivot 430 is still located in the accommodating space 405. In other words, when an angle formed between the stand 300 and the front panel 100 is equal to or less than the first angle θ1, the pivot 430 dose not slide. Accordingly, the sliding element 420 connected to the end of the pivot 430 and the spring strip 440 abutted by the sliding element 420 are not moved. When the angle formed between the stand 300 and the front panel 100 is less than the first angle θ1, the angle could be maintained by the rotation damping of the pivot 430. However, the scope of this invention is not limited to this respect. When the first angle θ1 is formed between the stand 300 and the front panel 100, the end 432 of the pivot 430 connected to the stand 300 abuts the back cover 200. Therefore, when the electronic device is in a standing state (as shown in FIG. 4) with the stand 300, the first angle θ1 could be fixed by the pivot 430 abutting the back cover 200.

Figure 5B:
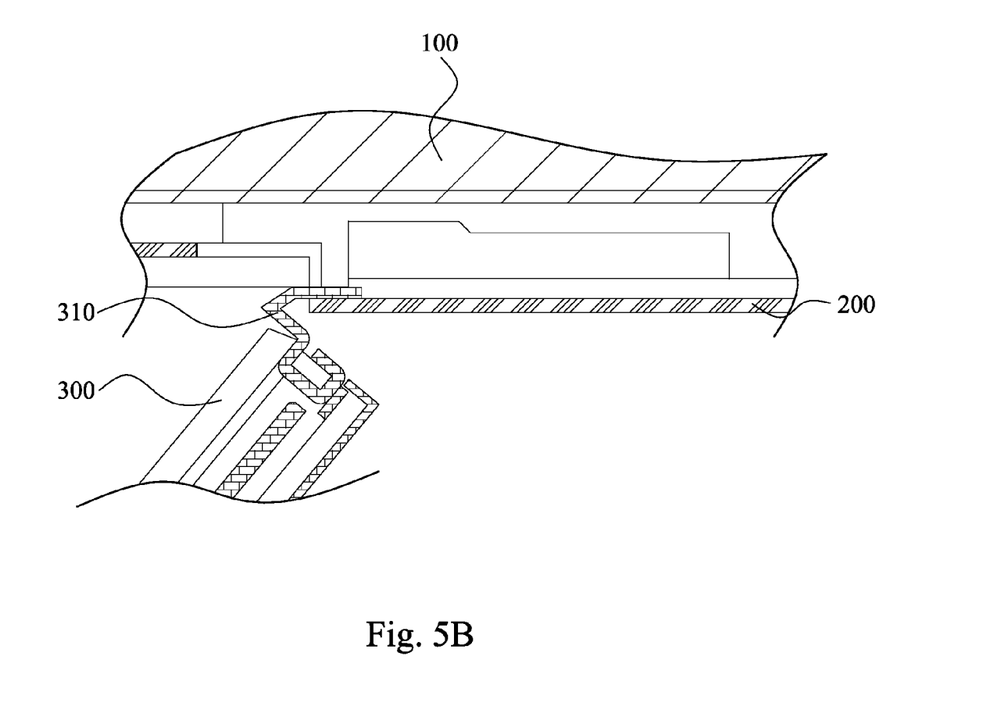
FIG. 5B is a cross-section view along line 5B-5B in FIG. 4.

Reference is made to FIG. 2 and FIG. 5B, where FIG. 5B is a cross-section view along line 5B-5B in FIG. 4. In this embodiment, the stand 300 includes at least one extending portion 310. For example, in FIG. 2, the stand 300 includes two extending portion 310 which are located between the three hinge modules 400, respectively. When the first angle θ1 is formed between the stand 300 and the front panel 100, the extending portion 310 may abuts the back cover 200.

Figure 6:
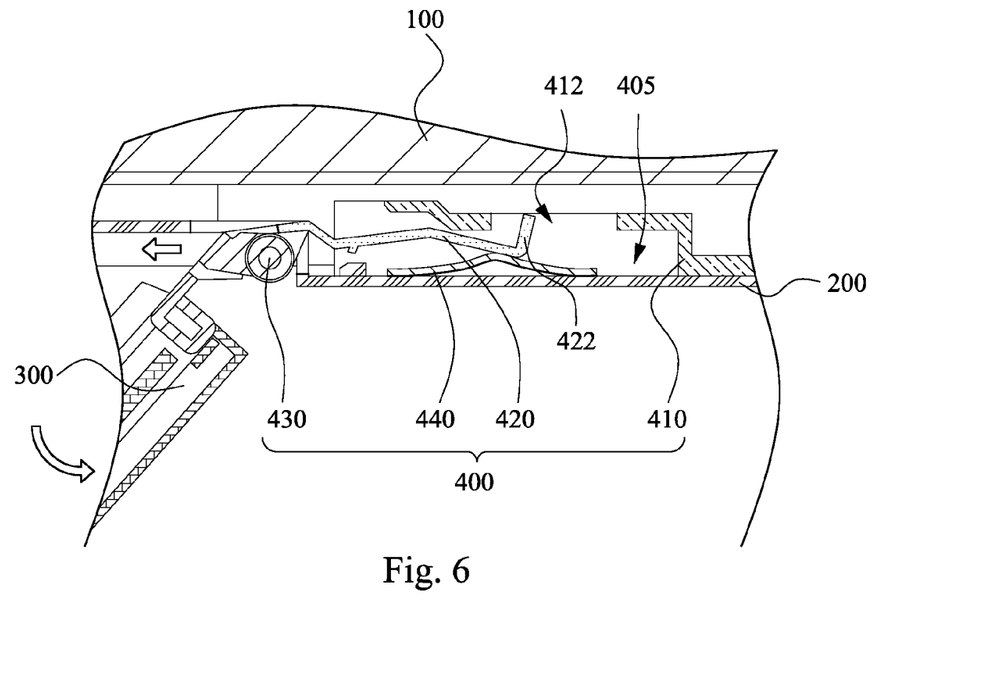
FIG. 6 is a cross-section view of the electronic device in FIG. 5A with the stand being forced.

Reference is made to FIG. 6 which is a cross-section view of the electronic device in FIG. 5A with the stand 300 being forced to provide another angle. The cross-section position in FIG. 6 is the same as that in FIG. 5A. When the electronic device is in opened state as shown in FIG. 4, the end 432 of the pivot 430 abuts the back cover 200 (as shown in FIG. 5A) and the extending portion 310 also abuts the back cover 200 (as shown in FIG. 5B). Therefore, when the stand 300 of the electronic device is forced in the direction far from the front panel 100 continuously (i.e. in FIG. 6, pushing the stand 300 counterclockwise), the pivot 430 is moved out from the accommodating space 405 and exposed from the back cover 200. Meanwhile, the sliding element 420 is moved by the pivot 430 so that the sliding element 420 is moved leftward of FIG. 6. Accordingly, the hook portion 422 of the sliding element 420 is moved into the hole 412 of the fixing element 410. During the sliding element 420 is sliding, the spring strip 440 is deformed by the sliding element 420.

Figure 7:
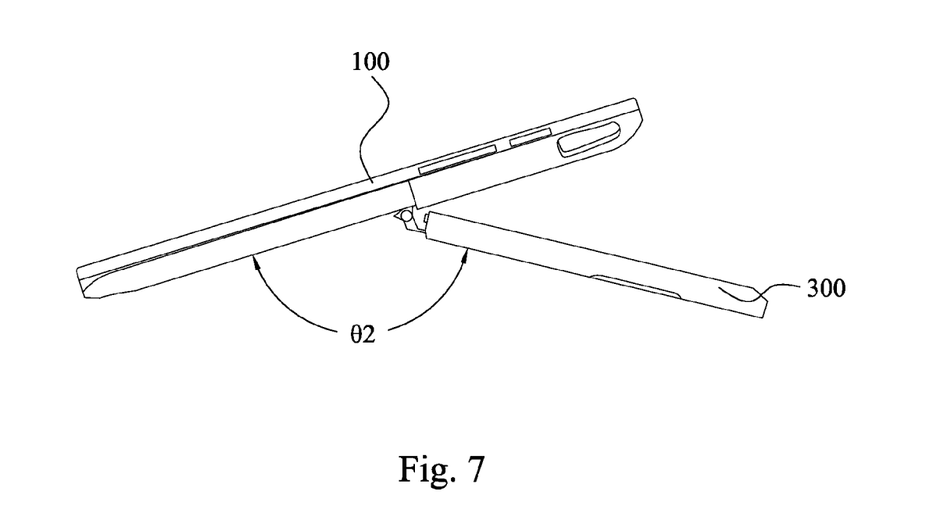
FIG. 7 is a perspective view of the electronic device in FIG. 1A which is in another opened state.

Reference is made to FIG. 7 which is a perspective view of the electronic device in FIG. 1A which is in another opened state. As shown in FIG. 7, when the stand 300 in FIG. 6 is forced continuously, a second angle θ2 is formed between the stand 300 and the front panel 100, so that the front panel 100 stands on a plane. The second angle θ2 is greater than the first angle θ1. In this embodiment, the second angle θ1 may be, for example, 150 degrees. However, the scope of this invention is not limited to this respect. Basically, the first angle θ1 may be between 0 degree and 90 degrees and the second angle θ2 may be between 90 degrees and 180 degrees.

Figure 8:
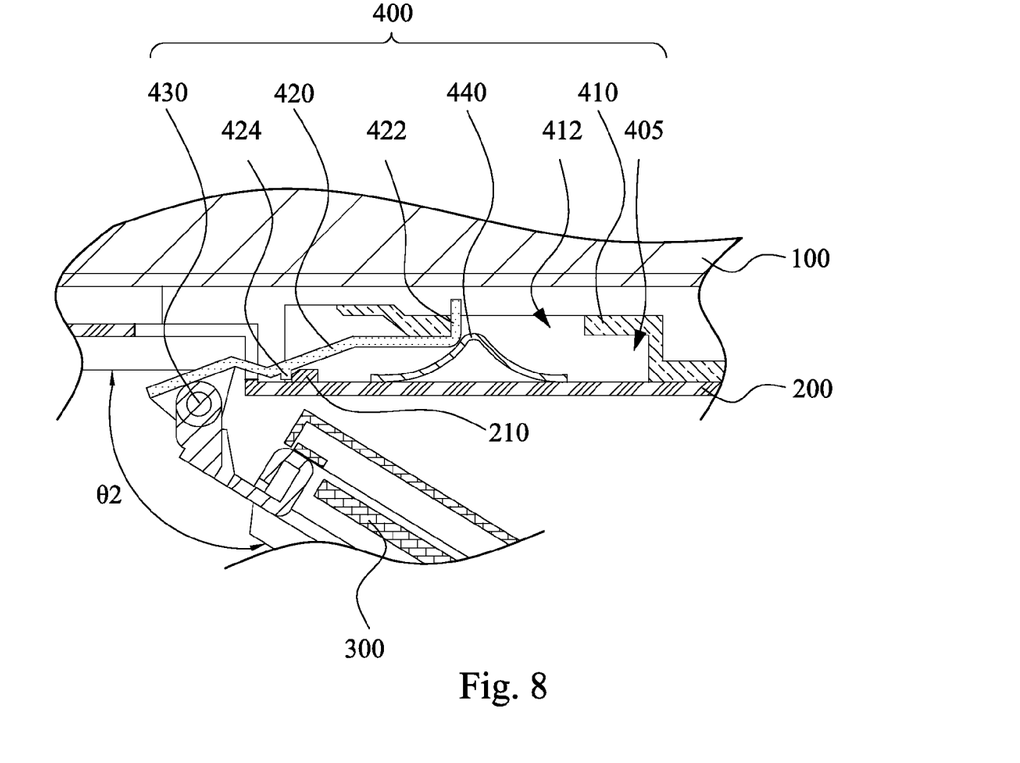
FIG. 8 is a cross-section view of the electronic device in FIG. 7.

Reference is made to FIG. 8 which is a cross-section view of the electronic device in FIG. 7. The cross-section position in FIG. 8 is the same as that in FIG. 5A. in greater detail, when the second angle θ2 is formed between the stand 300 and the front panel 100, the pivot 430 and the sliding element 420 had been moved by the stand 300 so that the pivot 430 is exposed from the back cover 200. However, due to being caught on the hole 412 of the fixing element 410 by the hook portion 422, that prevents the sliding element 420 from being pulled out from the accommodating space 405 by the pivot 430, and thus the position of the pivot 430 can be held. Furthermore, when the hook portion 422 is caught on the hole 412, the spring strip 440 releases the elastic potential energy and recovers the deformation so that the spring strip 440 provides a pushing force on the hook portion 422. Then, the hook portion 422 is caught on the hole 412 more stably.

In this embodiment, the back cover 200 includes a first latch 210 and the sliding element 420 includes a second latch 424. When the second angle θ2 is formed between the stand 300 and the front panel 100, the first latch 210 is engaged with the second latch 424 so that the relative position between the sliding element 420 and the back cover 200 is fixed. In greater detail, when the electronic device is in standing state as shown in FIG. 7, the stand 300 supports the front panel 100 through the pivot 430, which in turns generating a potential pushing force stored in the pivot 430 to push itself into the accommodating space 405. However, because the first latch 210 is engaged with the second latch 424, it prevents the sliding element 420 from sliding back into the accommodating space 405 by the potential pushing force stored in the pivot 430.

If a user wants the electronic device back to the closed state, that is, to push the pivot 430 back to the accommodating space 405, the pivot 430 can be pushed along the direction forwarding to the front panel 100 by operating the stand 300 first. Accordingly, the pivot 430 moves the sliding element 420 to let the second latch 424 separated from the first latch 210. Then, the sliding element 420 and the pivot 430 may be pushed back into the accommodating space 405 simultaneously. Thus, the electronic device is returned to the state as shown in FIG. 3.

Reference is made back to FIG. 1B and FIG. 2. When the stand 300 covers the front panel 100 (i.e. the electronic device is in closed state), the extending portion 310 is covered by the back cover 200. In specifically, when the electronic device is in closed state, the hinge module 400 and the extending portion 310 are both disposed between the back cover 200 and the front panel 100 so that the aesthetics of the electronic device is enhanced.

Figure 9A:
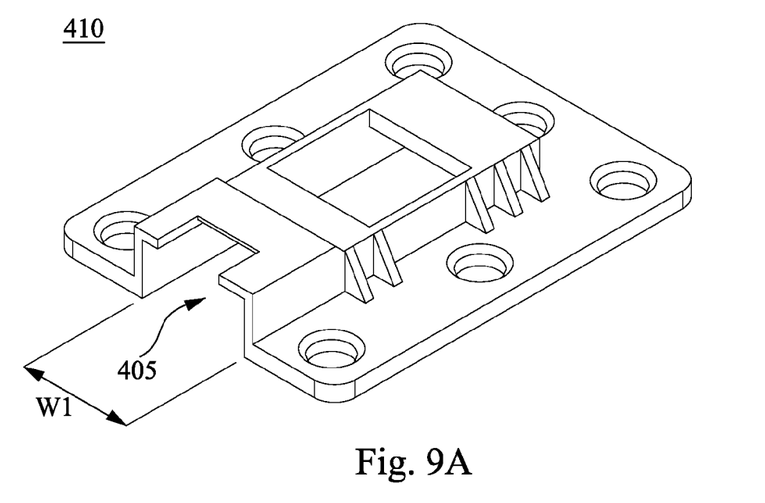
FIG. 9A is a schematic enlarged view of a fixing element in FIG. 2.
Figure 9B:
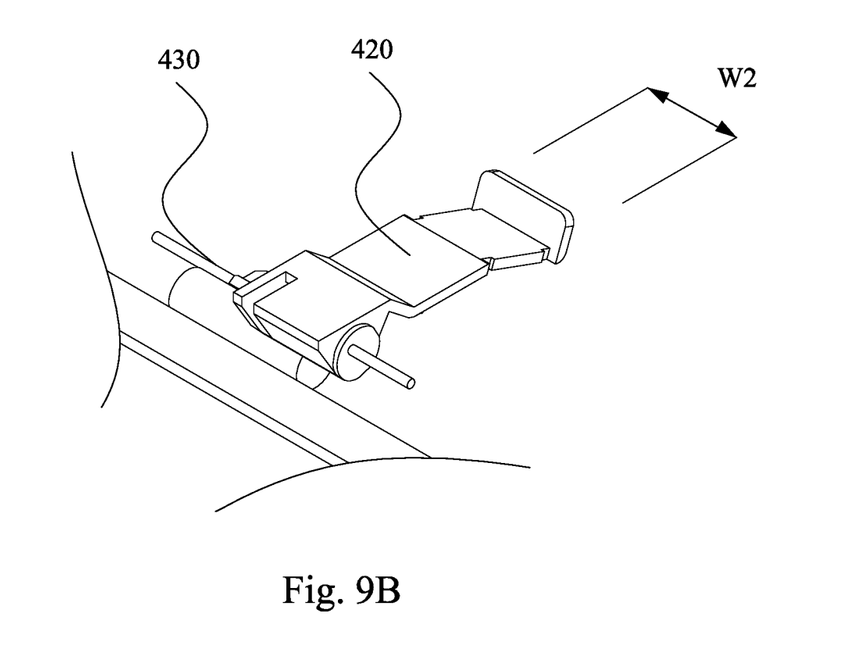
FIG. 9B is a schematic enlarged view of a sliding element and the pivot in FIG. 2.

Reference is made to FIG. 9A and FIG. 9B. FIG. 9A is a schematic enlarged view of the fixing element 410 in FIG. 2, and FIG. 9B is a schematic enlarged view of the sliding element 420 and the pivot 430 in FIG. 2. In this embodiment, the width W1 of the accommodating space 405 substantially equals to the width W2 of the sliding element 420. When the sliding element 420 slides (as shown in FIG. 6), the sliding element 420 may only slide in the direction that the sliding element 420 enters or exits the accommodating space 405, and not move in the lateral direction of the accommodating space 405. Accordingly, it prevents the pivot 430 from sliding out from the accommodating space 405 in a wrong way, which may cause the incorrect movement when the electronic device stands on a plane. The incorrect movement may make the stand 300 press the pivot 430 inappropriately and result in the damage of the pivot 430.

Reference is made back to FIG. 2. In one or more embodiments, the stand 300 includes an opening 302 and the electronic device further includes a keyboard 500 detachably disposed in the opening 302. In greater detail, the front panel may be, for example, a touch panel. In order to be more convenient, a user may utilize the keyboard 500 as another input device in addition to the touch panel. The keyboard 500 may be an optional peripheral device. The keyboard 500 may be assembled into the stand 300 so that the user may carry the front panel 100 and the keyboard 500 together. When the user wants to use the keyboard 500, he or she may detach the keyboard 500 from the stand 300. Thus, the convenience for the user is improved. The keyboard 500 may be a wireless keyboard or a wired keyboard. The scope of this invention is not limited in this respect.

In one or more embodiments, the electronic device further includes a plurality of magnets 600 disposed on one side of the stand 300 facing the front panel 100, and the keyboard 500 includes a plurality of metal sheets 510. The keyboard 500 is fixed on the stand 300 by the magnets 600 attracting the metal sheets 510. Moreover, when the electronic device is in closed state, the magnets 600 can be disposed between the stand 300 and the back cover 200 so that the aesthetics of the electronic device is improved. However, the utilization of the magnets 600 and the metal sheets 510 is merely an example and not tended to limit this invention. In other embodiments, the keyboard 500 may be fixed on the stand 300 through a latch.

In summary, since the hinge module 400 is disposed between the back cover 200 and the front panel 100 according to the electronic device above, the hinge module 400 may not extend from the back cover 200. In addition, when the stand 300 covers the front panel 100 (i.e. the electronic device is in closed state), the stand 300 and the back cover 200 may cover the main surface 102 of the front panel 100. In other words, as shown in FIG. 1B, the stand 300 and the back cover 200 may form a smooth surface. Moreover, opening design is not necessary for the interface 202 between the stand 300 and the back cover 200 so that the aesthetics of the electronic device is improved. Because of the design of the stand 300, the keyboard 500 may be detachably disposed in the opening 302. Therefore, the aesthetics of the electronic device and the convenience for carrying are both enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
   a front panel;
   a back cover fixed on a main surface of the front panel;
   a stand disposed on a surface of the back cover opposite to the front panel and rotatable relative to the surface, the stand having an opening;
   a keyboard detachably disposed in the opening; and
   at least one hinge module disposed between the front panel and the back cover, wherein the hinge module comprises:
      a fixing element having a hole, the fixing element being fixed on the back cover so that an accommodating space is formed between the fixing element and the back cover;
      a sliding element having a hook portion, the sliding element being disposed in the accommodating space and being slidable relative to the accommodating space;
      a pivot disposed in the accommodating space and slidable relative to the accommodating space, the sliding element being connected to the stand by the pivot; and
      a spring strip disposed in the accommodating space, the spring strip being fixed on the back cover and being deformable,
   wherein when the stand covers the front panel, the pivot is located in the accommodating space; when a first angle is formed between the front panel and the stand, the pivot is located in the accommodating space; when a second angle is formed between the front panel and the stand, and the second angle is greater than the first angle, the pivot and the sliding element are moved by the stand so that the pivot is exposed from the back cover, and the sliding element is caught on the hole of the fixing element by the hook portion and the sliding element is abutted by the spring strip.

2. The electronic device of claim 1, wherein when the stand covers the front panel, the stand and the back cover both cover the main surface of the front panel.

3. The electronic device of claim 1, wherein when the first angle is formed between the front panel and the stand, an end of the pivot connecting to the stand abuts the back cover.

4. The electronic device of claim 3, wherein the stand comprises at least one extending portion, and when the first angle is formed between the front panel and the stand, the extending portion abuts the back cover.

5. The electronic device of claim 4, wherein when the stand covers the front panel, the extending portion is covered by the back cover.

6. An electronic device, comprising:
   a front panel;
   a back cover fixed on a main surface of the front panel, the back cover comprising a first latch;
   a stand disposed on a surface of the back cover opposite to the front panel and rotatable relative to the surface; and
   at least one hinge module disposed between the front panel and the back cover, wherein the hinge module comprises:
      a fixing element having a hole, the fixing element being fixed on the back cover so that an accommodating space is formed between the fixing element and the back cover;
      a sliding element having a hook portion, the sliding element being disposed in the accommodating space and being slidable relative to the accommodating space, the sliding element comprising a second latch;
      a pivot disposed in the accommodating space and slidable relative to the accommodating space, the sliding element being connected to the stand by the pivot; and
      a spring strip disposed in the accommodating space, the spring strip being fixed on the back cover and being deformable,
   wherein when the stand covers the front panel, the pivot is located in the accommodating space; when a first angle is formed between the front panel and the stand, the pivot is located in the accommodating space; when a second angle is formed between the front panel and the stand, and the second angle is greater than the first angle, the pivot and the sliding element are moved by the stand so that the pivot is exposed from the back cover, and the sliding element is caught on the hole of the fixing element by the hook portion and the sliding element is abutted by the spring strip; and when the second angle is formed between the stand and the front panel, the first latch is engaged with the second latch so that a relative position between the sliding element and the back cover is fixed.

7. The electronic device of claim 1, wherein the first angle is between 0 degree and 90 degrees, and the second angle is between 90 degrees and 180 degrees.

8. The electronic device of claim 1, wherein a width of the accommodating space substantially equals to a width of the sliding element.

9. The electronic device of claim 1, further comprising a plurality of magnets disposed on one side of the stand facing the front panel, wherein the keyboard comprises a plurality of metal sheets, and the keyboard is fixed on the stand by the magnets attracting the metal sheets.

10. An electronic device, comprising:
a front panel;
a back cover fixed on a main surface of the front panel;
a stand disposed on a surface of the back cover opposite to the front panel and rotatable relative to the surface, the stand comprising at least one extending portion; and
at least one hinge module disposed between the front panel and the back cover, wherein the hinge module comprises:
   a fixing element having a hole, the fixing element being fixed on the back cover so that an accommodating space is formed between the fixing element and the back cover;
   a sliding element having a hook portion, the sliding element being disposed in the accommodating space and being slidable relative to the accommodating space;
   a pivot disposed in the accommodating space and slidable relative to the accommodating space, the sliding element being connected to the stand by the pivot; and
   a spring strip disposed in the accommodating space, the spring strip being fixed on the back cover and being deformable,
wherein when the stand covers the front panel, the pivot is located in the accommodating space; when a first angle is formed between the front panel and the stand, the pivot is located in the accommodating space and an end of the pivot connecting to the stand abuts the back cover, and the extending portion abuts the back cover; when a second angle is formed between the front panel and the stand, and the second angle is greater than the first angle, the pivot and the sliding element are moved by the stand so that the pivot is exposed from the back cover, and the sliding element is caught on the hole of the fixing element by the hook portion and the sliding element is abutted by the spring strip.

* * * * *